UNITED STATES PATENT OFFICE.

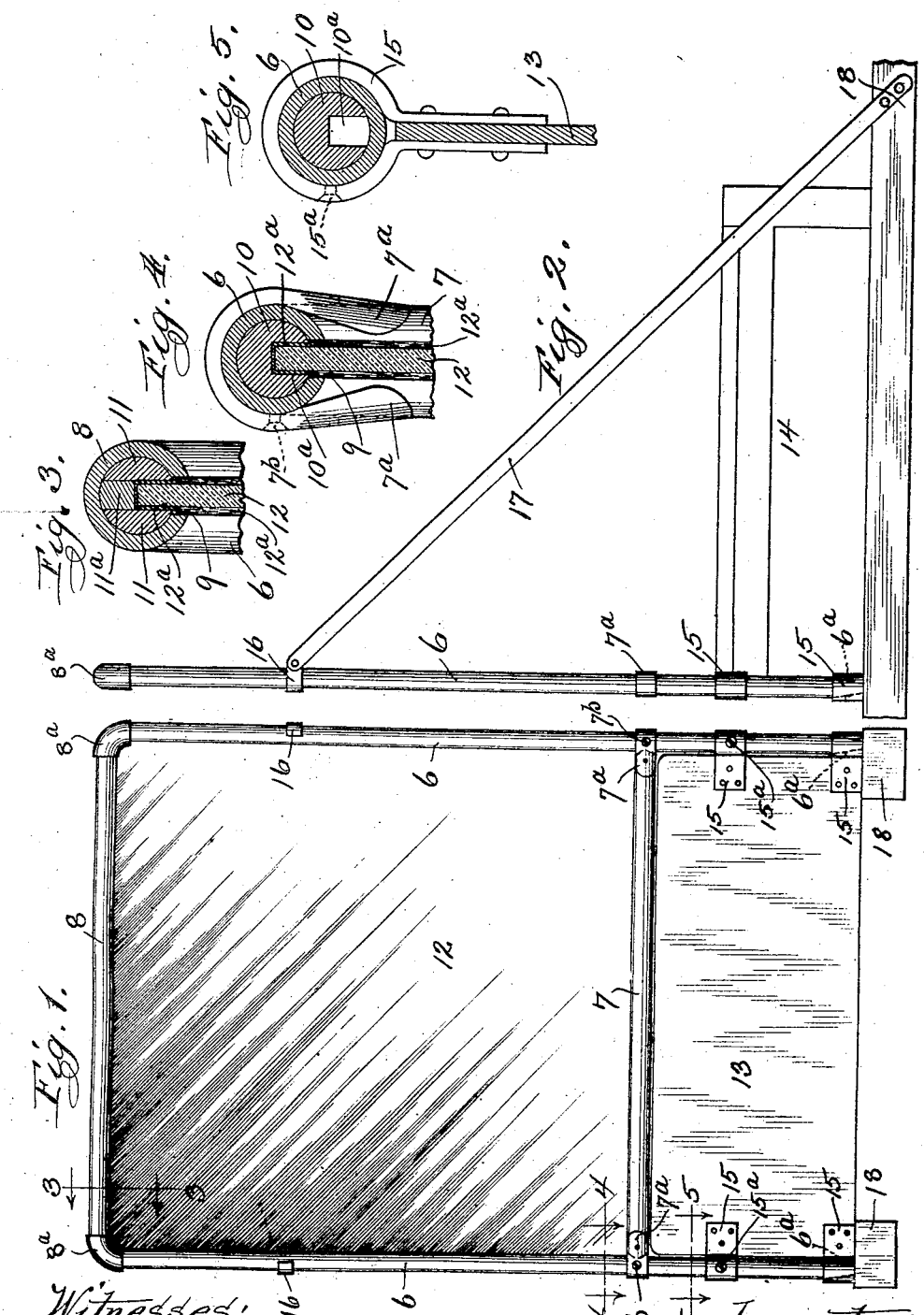

JAMES C. SIMM, JR., AND ANDREW P. OLSON, OF CHICAGO, ILLINOIS.

FRAME FOR WIND-SHIELDS FOR AUTOMOBILES.

No. 818,524.  Specification of Letters Patent.  Patented Feb. 27, 1906.

Application filed July 17, 1905. Serial No. 270,148.

*To all whom it may concern:*

Be it known that we, JAMES C. SIMM, Jr., and ANDREW P. OLSON, of Chicago, in the State of Illinois, have invented certain new and useful Improvements in Frames for Wind-Shields for Automobiles, of which the following is a specification.

Our invention relates to improvements in frames for supporting transparent wind-shields above the dashboard or in conjunction with the vehicle-hood for protecting the rider from the wind produced by the motion of the vehicle while running it and viewing the roadway in front; and the objects of the improvements are, first, to provide a light metallic frame for supporting a large pane of glass over the dashboard or above the hood of the vehicle in front of the occupants; second, to provide a cushion in connection with the frame for holding the edges of the glass free from contact with the metal of the frame and preventing looseness of the glass in the frame which would cause rattling by the jar from the moving vehicle; third, to provide the frame with a detachable bottom-piece serving to facilitate the putting of the frame on the glass, and, fourth, to provide means for readily mounting the frame on the dashboard or hood or removing it therefrom. We have attained these objects by the means illustrated in the accompanying drawings, in which—

Figure 1 is a front elevation of a construction containing the invention, the frame being arranged above the dashboard. Fig. 2 is a side elevation including the hood of the vehicle. Fig. 3 is a detail showing an enlarged sectional view through the top member of the frame at the line 3 3 of Fig. 1. Fig. 4 is a detail showing a similar view of one of the side members of the frame at the line 4 4 of Fig. 1. Fig. 5 is a detail showing a similar view at the line 5 5 of Fig. 1.

The frame, as illustrated, is composed of tubular side members 6 and bottom and top members 7 8. The side members are extended below the bottom member and provided with taper ends, as seen in dotted lines at 6ª. At the top they are connected with the part 8 by means of corner-couplings 8ª, threaded and brazed on. The part 7 is detachable, being provided with eyes 7ª at the ends, formed by tapered pieces bent over the hollowed ends of the said part 7, as seen in Fig. 4, to form a circular orifice which will pass over and fit pretty close upon the side members 6.

The bottom, top, and side members are milled on their inner sides to form a slot extending through the tube-wall and along the entire length and width of the shield and through the corner-coupling 8ª, but not through the parts of the side members which project through the detachable part 7. Into the bore of the side members 6 is inserted a rod 10, Fig. 4, of pine or other soft wood, which is adapted to closely fit the bore of the tube and is provided with a groove 10ª, which is slightly narrower than the slot 9 and located centrally of the width thereof. The bore of the bottom and top members is filled with separate longitudinal sections 11 and 11ª of a rod of similar stuff, which is inserted sidewise through the slot 9, the parts 11 being put in first and shoved out in the tubular bore, so that the part 11ª then can be forced in between them to hold them in place and form the groove 10ª, similar to that in the rods 10 of the side members. The groove 10ª is thus formed around the entire interior of the frame, and the width thereof corresponds to the thickness of the edge of the glass plate 12, which constitutes the wind-shield. With the frame thus constructed the bottom part 7 can be slipped off of the side parts 6, so that said plate adapted to fit the frame can be slipped into the groove at the bottom or open side of the frame and passed along therein until the end enters the said groove in the top part 8, when the bottom part can be slipped onto the tapered ends at 6ª and moved up until its groove 10ª passes over the bottom edge of said plate. Set-screws 7ᵇ are provided for securing the bottom part in place on the side members. It is advisable to fold a strip of cloth 12ª over the edge of the glass before inserting it in the groove in order to make a closer fit of the glass in the groove 10ª and partially fill the space between the glass and the sides of the slot 9.

The dashboard 13 or front end of the hood 14 is provided with eyes 15, adapted to receive the parts of the side members of the frame, which project below the bottom-piece 7, the taper ends fitting snugly in the lower of said eyes to prevent any looseness at the bottom, and set-screws 15ª in the upper of said eyes being adapted to hold the parts from being lifted or thrown upward when in service.

The side members of the frame are provided with eyepieces 16, securely brazed in place and having braces 17 connected thereto and to the sill 18 of the vehicle for maintaining the frame against the force of the air upon the plate-shield.

What is claimed is —

1. A rectangular frame for transparent wind-shields comprising interiorly-slotted metallic tubular parts and means for making one of said parts adjustable upon and detachable from its adjacent parts, in combination with grooved parts of elastic stuff fitted in the bore of the tubular parts the grooves in the elastic stuff being of less width than the slots of the tubular parts and arranged to coincide therewith and form an open, straight elastic groove around the interior of the frame, as specified.

2. A rectangular frame of the class mentioned comprising metallic tubular parts each provided with a slot along its inner side, one of said members having eyes and set-screws at its ends adapted to slide over and in line with the adjacent transverse parts, in combination with grooved parts of elastic stuff fitted in the bore of the tubular parts said groove being of less width than said slot.

3. A rectangular frame of the class mentioned comprising slotted tubular parts, one of said parts provided with eyes at its ends adapted to slide upon and in line with the adjacent transverse parts having greater length than the frame and provided with taper ends, in combination with the dashboard provided with eyes adapted to receive and hold the taper ends of said adjacent transverse parts, as specified.

4. A rectangular frame of the class mentioned comprising in combination slotted tubular parts one of said parts being provided with means whereby it is adapted to slide upon and in line with the adjacent transverse parts having greater length than the frame, grooved parts of elastic stuff fitted in the bore of the tubular parts and means for securing said sliding part in place upon said adjacent transverse parts with their ends projecting at one side of the frame to serve as a means of support therefor, as specified.

JAMES C. SIMM, Jr.
ANDREW P. OLSON.

Witnesses:
ANNIE M. ADAMS,
RACHEL ELIASSOF.